United States Patent [19]

Suzuki et al.

[11] 4,451,743
[45] May 29, 1984

[54] DC-TO-DC VOLTAGE CONVERTER

[75] Inventors: Fuminori Suzuki; Singo Ichikawa, both of Tanashi, Japan

[73] Assignee: Citizen Watch Company Limited, Tokyo, Japan

[21] Appl. No.: 328,990

[22] Filed: Dec. 9, 1981

[30] Foreign Application Priority Data

Dec. 29, 1980 [JP] Japan ............................ 55-186857
Dec. 29, 1980 [JP] Japan ............................ 55-186858
Dec. 29, 1980 [JP] Japan ............................ 55-186859
Jan. 23, 1981 [JP] Japan ............................ 56-9180
Jan. 23, 1981 [JP] Japan ............................ 56-9181

[51] Int. Cl.³ .............................................. H02M 3/18
[52] U.S. Cl. ...................................... 307/110; 363/59; 363/60; 320/1; 323/370
[58] Field of Search ................... 307/110; 363/59, 60, 363/61, 62; 320/1; 323/370

[56] References Cited

U.S. PATENT DOCUMENTS 4,205,369  5/1980  Asano ..................... 363/62
4,321,661  3/1982  Sano ...................... 363/60

FOREIGN PATENT DOCUMENTS 2511795  6/1971  Fed. Rep. of Germany ........ 363/60

Primary Examiner—E. A. Goldberg
Assistant Examiner—Derek Jennings
Attorney, Agent, or Firm—Jordan and Hamburg

[57] ABSTRACT

A DC-to-DC voltage converter is disclosed for converting the voltage from a battery to provide a power supply voltage whose value can be equal to the battery voltage multiplied by or divided by a non-integral factor, e.g. $\frac{2}{3}$. The converter operates on the principle of capacitor charge switching, and high conversion efficiency is achieved in operation at very low levels of supply current, such as are utilized in an electronic timepiece.

10 Claims, 24 Drawing Figures

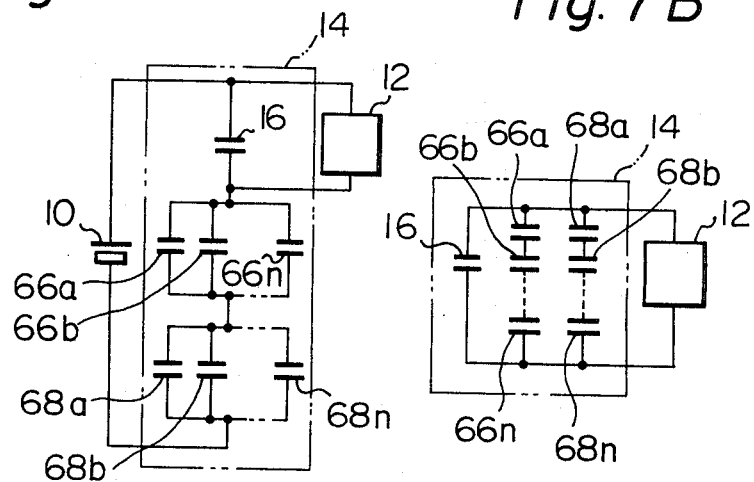
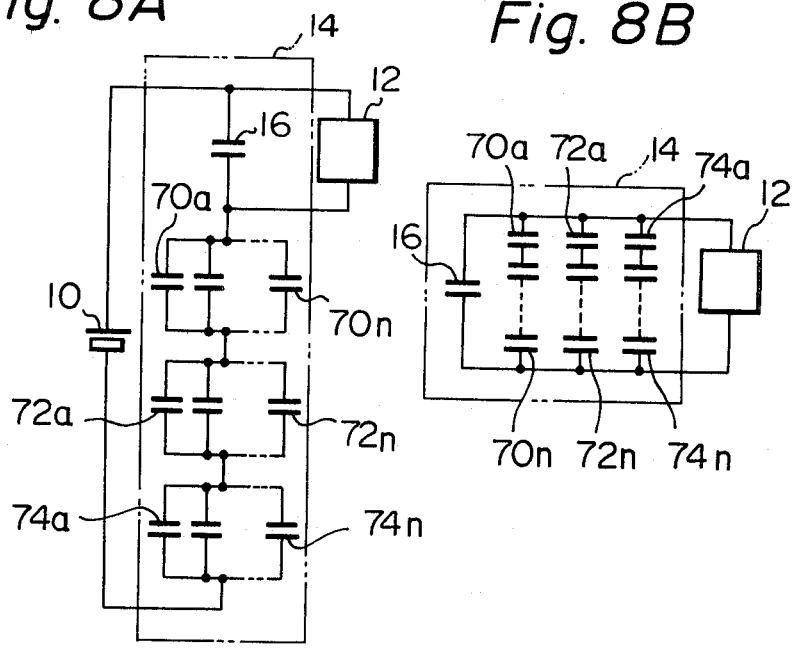

Fig. IIA
PRIOR ART
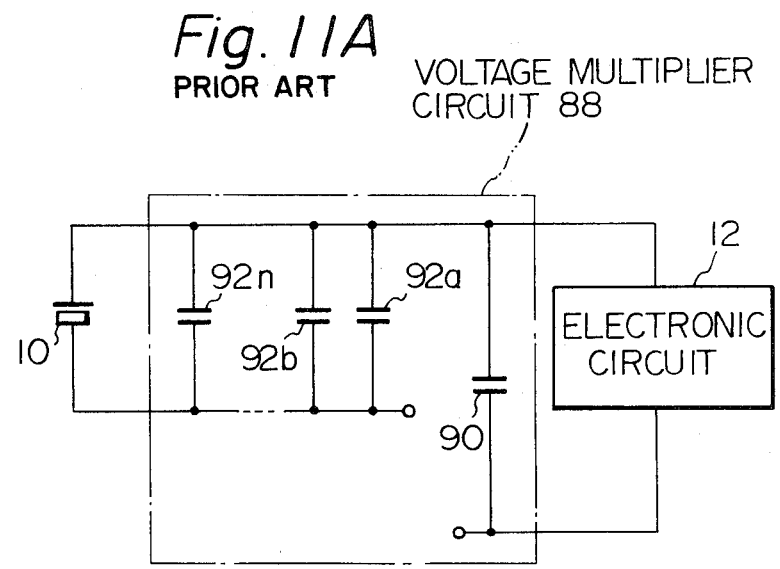
Fig. IIB   PRIOR ART
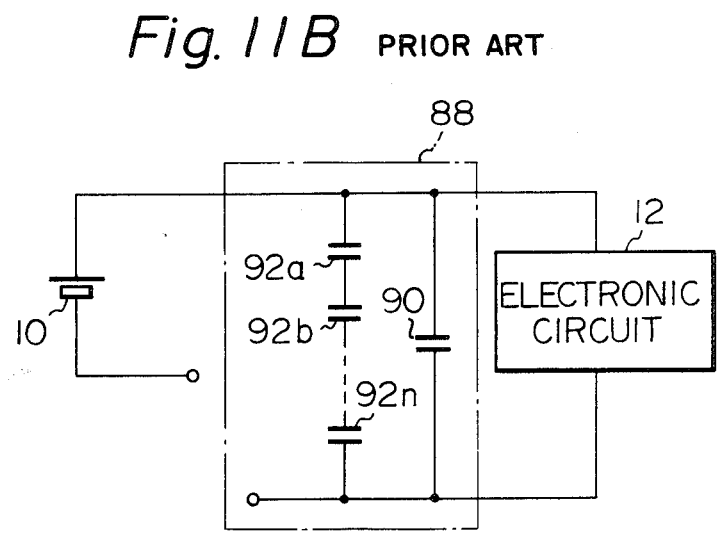

DC-TO-DC VOLTAGE CONVERTER

BACKGROUND OF THE INVENTION

In recent years, there has been an increasing trend toward the use of various types of battery-powered small-size electronic devices, including electronic timepieces, calculators, etc. Such devices have become increasingly practical as a result of various developments in the electronic field, such as the widespread use of CMOS integrated circuits, which have a very low level of power consumption. However in spite of the improved performance of battery-powered devices brought about by such developments, several disadvantages still remain. Even with a low level of circuit current consumption, the voltage produced by a battery will fall throughout its operating life, the resulting variations in the battery voltage being determined by the particular type of battery. In some cases the battery voltage will fall relatively gradually throughout the operating life, while in other cases the voltage will remain relatively constant throughout most of the operating life and then suddenly fall sharply toward a lower level, and remain close to that level up to the end of the battery life. Such variations in battery voltage can have an adverse effect upon the operation of an electronic circuit which is powered by the battery, so that in many cases it is desirable or necessary to provide some means of providing a stable supply voltage from the battery voltage. This can be done by utilizing a conventional type of voltage regulator circuit, in which a control element connected between the battery and the load provides a certain degree of voltage drop, such as to maintain a constant voltage at the load. With such a voltage regulator circuit, the current which flows out of the battery is always equal to or greater than the current which flows in the load, i.e. a certain amount of power is dissipated by the control element in order to provide voltage regulation. However in the case of electronic equipment of small size, powered by a miniature type of battery, for example an electronic timepiece powered by a silver oxide cell, it is essential that power consumption be reduced to the minimum possible level, in order to assure sufficient length of battery life. Thus a conventional type of voltage regulator circuit is not a practicable method of overcoming the effects of variations in battery voltage upon the electronic circuitry supplied by the battery, in such a case. An alternative approach to this problem is to use a charge switching type of capacitor voltage divider known in the prior art and described hereinafter, to convert the battery voltage to provide a supply voltage of lower value, e.g. one half of the battery voltage, and to use this supply voltage to operate an electronic circuit during the first part of the battery life and utilize the battery voltage directly during the last part of the battery life. In this way, a more constant level of supply voltage can be obtained than is available from the battery alone. However, as will be described hereinafter, such a prior art type of capacitor voltage divider circuit can only provide a voltage division ratio which is at most $\frac{1}{2}$, i.e. a voltage division ratio of $\frac{1}{2}$, $\frac{1}{3}$, $\frac{1}{4}$, etc. Thus, for example, it is not possible to provide certain highly desirable values of voltage division ratio, such as for example would enable a voltage of 1 V to be obtained from a 1.5 V silver oxide battery. Thus, although the charge switching capacitor voltage divider circuit has a very high conversion efficiency, it has not been possible hitherto to utilize it for providing a supply voltage from the battery voltage of miniature electronic device such as an electronic timepiece.

Another requirement which exists at present is for the provision of a plurality of DC supply voltage levels, for the matrix drive circuits of a liquid crystal display device used in a miniature electronic device powered by a small-capacity battery, for example an electronic timepiece or pocket calculator. It is necessary to provide at least three different voltage levels to supply power to such a drive circuit. To obtain these supply voltage levels from a single battery, it is of course possible to use the battery voltage as the highest level and to utilize conventional voltage regulator circuits to provide voltages of lower level than the battery voltage. However, as described above, it is undesirable to use such voltage regulator circuits from considerations of minimizing battery power consumption.

It can therefore be understood that there exists a requirement for some means of converting the voltage of a battery to a higher and/or lower level to provide one or more supply voltages, with a high degree of conversion efficiency even at very low operating power levels, and with a high degree of flexibility in selecting the voltage conversion factor. These requirements are completely met by a DC-to-DC voltage converter circuit according to the present invention. Such a DC-to-DC voltage converter circuit provides the very high level of conversion efficiency of a conventional charge switching capacitor voltage divider circuit, but enables a supply voltage to be produced whose value can be equal to the battery voltage multiplied or divided by a factor which need not be an integer, for example $\frac{2}{3}$, 2/5, etc. A DC-to-DC voltage converter circuit according to the present invention therefore provides means whereby a substantially constant level of supply voltage can be obtained from the battery of a miniature electronic device, or whereby a number of levels of supply voltage can be obtained from a miniature battery, of value greater than or less than the battery voltage, for supplying power to matrix drive circuitry of a liquid crystal display device.

SUMMARY OF THE INVENTION

The present invention relates to a DC-to-DC converter circuit for converting the voltage of a battery to provide a supply voltage having a value different from the battery voltage. More specifically the present invention relates to a DC-to-DC converter having a very high conversion efficiency even at supply currents of the order of a fraction of a microampere, and for which the voltage conversion factor can be flexibly determined to have a suitable value.

A DC-to-DC converter circuit according to the present invention comprises a main capacitor, a plurality of auxiliary capacitors, and electronic switching means for repetitively and alternately connecting the auxiliary capacitors in parallel with one another and (as a parallel-connected group) in series with the main capacitor, and connecting the auxiliary capacitors in series with one another and (as a series-connected group) in parallel with the main capacitor. The voltage division or multiplication factor of the circuit is determined by the number of auxiliary capacitors. Furthermore, a plurality of groups of auxiliary capacitors can be used, and in this case the voltage conversion factor is determined both by the number of groups of auxiliary capacitors and the number of capacitors in each group. The electronic switching means for controlling the interconnections between the main and auxiliary capacitors can conveniently comprise a group of electronic switching elements which are operated by switching signals generated within an electronic circuit powered by the output voltage from the DC-to-DC converter circuit.

BRIEF DESCRIPTION OF THE DRAWINGS

FIGS. 7A and 7B are simplified circuit diagrams for illustrating the principles of operation of another embodiment of a voltage step-down circuit according to the present invention, in which two groups of auxiliary capacitors are utilized;

FIGS. 8A and 8B are simplified circuit diagrams for illustrating the operation of another embodiment of a voltage step-down circuit according to the present invention, in which three groups of auxiliary capacitors are utilized;

FIGS. 11A and 11B are simplified circuit diagrams for illustrating the operation of a prior art type of capacitor voltage multiplied circuit, used for battery voltage step-up conversion;

DESCRIPTION OF THE PREFERRED EMBODIMENTS

Figure 1A:
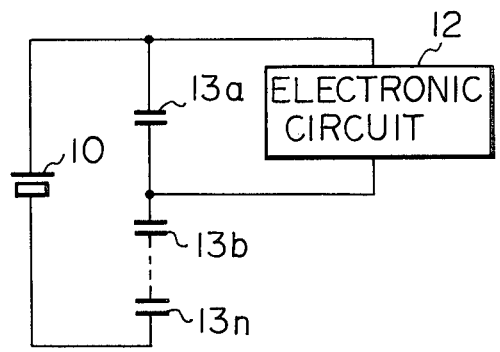
FIGS. 1A and 1B are simplified circuit diagrams for illustrating the operation of a prior art type of capacitor voltage divider circuit used for battery voltage step-down conversion.
Figure 1B:
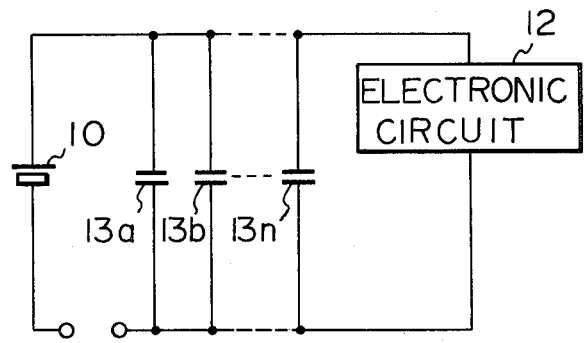

Before describing some embodiments of the present invention, a prior art type of capacitor voltage divider circuit will first be described, with reference to FIGS. 1A and 1B. FIG. 1A shows such a circuit in a first operating condition, in which a group of capacitors 13a, 13b, ... 13n (i.e. a total of n capacitors) are connected in series with one another across a battery 10, to be charged from battery 10. A load, comprising an electronic circuit 12, is connected across one capacitor 13a. FIG. 1B shows the circuit in a second operating condition, in which capacitors 13a, 13b ... 13n are connected in parallel with one another and in parallel with electronic circuit 12, while isolated from battery 10, so that electronic circuit 12 is suppplied with power in the form of discharge current flowing from capacitors 13a, 13b ... 13n. Such a circuit operates by alternately and repetitively switching over between the states shown in FIGS. 1A and 1B. In other words, a charge operation is performed in which an electric charge is stored in capacitors 13a, 13b ... 13n by current flowing from battery 10, then the capacitors are isolated from battery 10 and a discharge operation is performed in which current flows into the load, i.e. electronic circuit 12, as a result of discharge of capacitors 13a, 13b, ... 13n.

The operation of such a circuit will now be described, assuming that each of capacitors 13a, 13b, ... 13n has an identical capacitance value, which will be designated as C, with the voltage of battery 10 being designated as Vb. For the state shown in FIG. 1A, with capacitors 13a, 13b, ... 13n connected in series across battery 10, assuming that charging of these capacitors has been completed, the voltage appearing across each capacitor will be equal to Vb/n. When the condition shown in FIG. 1B is now entered, so that capacitors 13a, 13b, ... 13n are connected in parallel across electronic circuit 12, then the voltage across each capacitor will fall from Vb/n to a lower value, which can be designated as Vd. The amount of charge transfer, i.e. capacitative discharge, which then occurs can be designated as Qd, which is given as:

$$Qd = n \times C \times (Vb/n - Vd)$$

When the charging condition shown in FIG. 1A is now entered, then the amount of charge which must be delivered from battery 10 to raise the voltage across each of capacitors 13a, 13b, ... 13n from the value Vd back up to the value Vb/n can be designated as Qc. In this case capacitors 13a, 13b, ... 13n are connected in series with one another, so that the total capacitance which they present to battery 10 is equal to C/n. The amount of change in voltage which takes place across this total capacitance is obtained by subtracting (n×Vd) from the battery voltage Vb. Thus, the value of Qc is given as:

$$Qc = C/n \times (Vb - n \times Vd)$$
$$= C \times (Vb/m - Vd)$$

The ratio between Qd and Qc is therefore equal to 1/n. From this it can be understood that under a condition of repetitive alternation between the charge and discharge conditions shown in FIGS. 1A and 1B respectively, the ratio between the amount of current drawn from battery 10 and the current which flows into electronic circuit 12 will be equal to 1/n.

Such a capacitor voltage divider circuit provides a very high conversion efficiency, with the amount of current drawn from battery 10 being reduced in proportion to the degree of voltage reduction attained. However the voltage division ratio provided by such a circuit is obviously limited to a certain range of values, of ½ or less (i.e. ½, ⅓, ¼, . . . and so on). This makes such a circuit impractical for certain voltage reduction applications. For example, it is desirable to produce a supply voltage of the order of 1 V from the approximately 1.5 V output of a silver oxide battery, in order to supply power to CMOS circuits in an electronic timepiece powered by such a battery. However with the capacitor voltage divider circuit of the prior art described above, it is only possible to produce a supply voltage of 0.75 V, or 0.5 V or less from a silver oxide battery.

It is of course possible to utilize a conventional type of voltage regulator circuit to produce any desired amount of voltage reduction of a battery voltage. However, such a voltage regulator circuit operates on the basis of a series element connected between the load and the battery, with the amount of voltage drop across this series element being automatically varied such as to provide a constant voltage across the load. The current which flows from the battery and that which flows in the load are essentially equal, with power being dissipated through the voltage drop in the series element. Such dissipation of battery power is unacceptable in certain applications, such as for an electronic timepiece powered by a miniature battery having a very limited capacity.

Thus, the capacitor voltage divider circuit of the prior art can provide a very high conversion efficiency, making it highly suitable in that respect for miniature battery-powered electronic devices, but has the disadvantage that the voltage division ratio cannot be flexibly selected. The voltage regulator type of circuit on the other hand can provide any desired voltage division ratio, but offers too low a conversion efficiency for certain applications. The above disadvantages are overcome by the present invention, as will now be described.

Figure 2A:
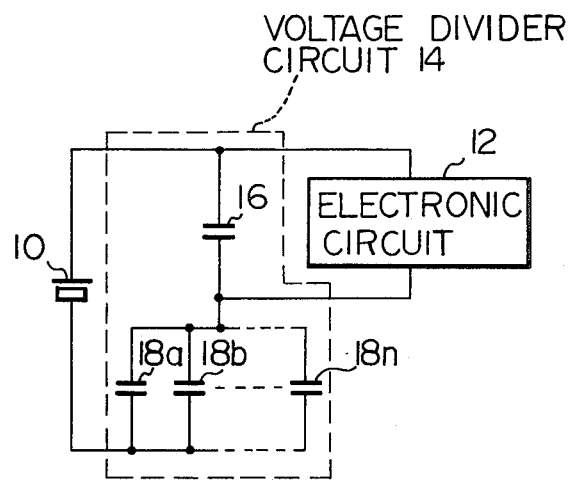
FIGS. 2A and 2B are simplified circuit diagrams for illustrating the principles of operation of a DC-to-DC converter circuit according to the present invention, comprising a voltage step-down circuit.
Figure 2B:
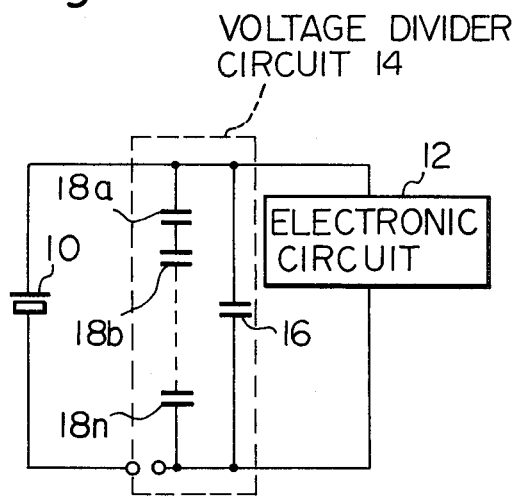

Referring first to FIGS. 2A and 2B, simplified circuit diagrams are shown which illustrate the basic principles of operation of a DC-to-DC voltage converter comprising a voltage step-down circuit according to the present invention. As in FIGS. 1A and 1B, numeral 10 denotes a battery and numeral 12 an electronic circuit which constitutes a load on the voltage step-down circuit. Numeral 14 denotes a voltage divider circuit comprising a capacitor 16 which is permanently connected in parallel with electronic circuit 12, and will be referred to as the main capacitor, and a set of capacitors 18a, 18b, . . . 18n, which will be referred to as the auxiliary capacitors. FIG. 2A illustrates the charging condition of circuit operation, in which auxiliary capacitors 18a, 18b, . . . 18n are connected in parallel with one another, and are connected in series with main capacitor 16. Battery 10 is connected across the series-connected main and auxiliary capacitors to thereby charge them. For simplicity of description it will be assumed that each of the n auxiliary capacitors is of identical value, as is also main capacitor 16. However it should be noted that this is no way a necessary prerequisite for such a circuit.

The operation of such a circuit will now be described. During actual operation, rapid and repetitive alternation between the charging condition of FIG. 2A and the discharge condition of FIG. 2B takes place, and as a result, a substantially steady-state voltage is developed across main capacitor 16. This voltage will be designated as Vm. The voltages appearing across auxiliary capacitors 18a, 18b, . . . 18n will be designated as Va, Vb, . . . Vn respectively, and the voltage of battery 10 as Vbt. Since auxiliary capacitors 18a, 18b, . . . 18n are connected in parallel during the charging condition of FIG. 2A, the voltages developed across each of these capacitors must be identical. Thus, the following relationships are true:

$$Va = Vb = - - = Vn$$

$$Vm = Va + Vb + - Vn$$

(as a result of the discharge condition of FIG. 2B)

$$Vbt = Va + Vm$$

Assuming that there are n auxiliary capacitors 18a, 18b, . . . 18n, and designating the voltage across each of the auxiliary capacitors as Vs, the following relationships are true:

$$Vm = n \times Vs$$

$$Vbt = Vs + Vm = (n+1) \times Vs$$

And thus the voltage division ratio Vm/Vbt is given as:

$$Vm/Vbt = n/(n+1)$$

If (n+1) is designated as N, then the voltage division ratio can be rewritten as (N−1)/N.

Figure 3:
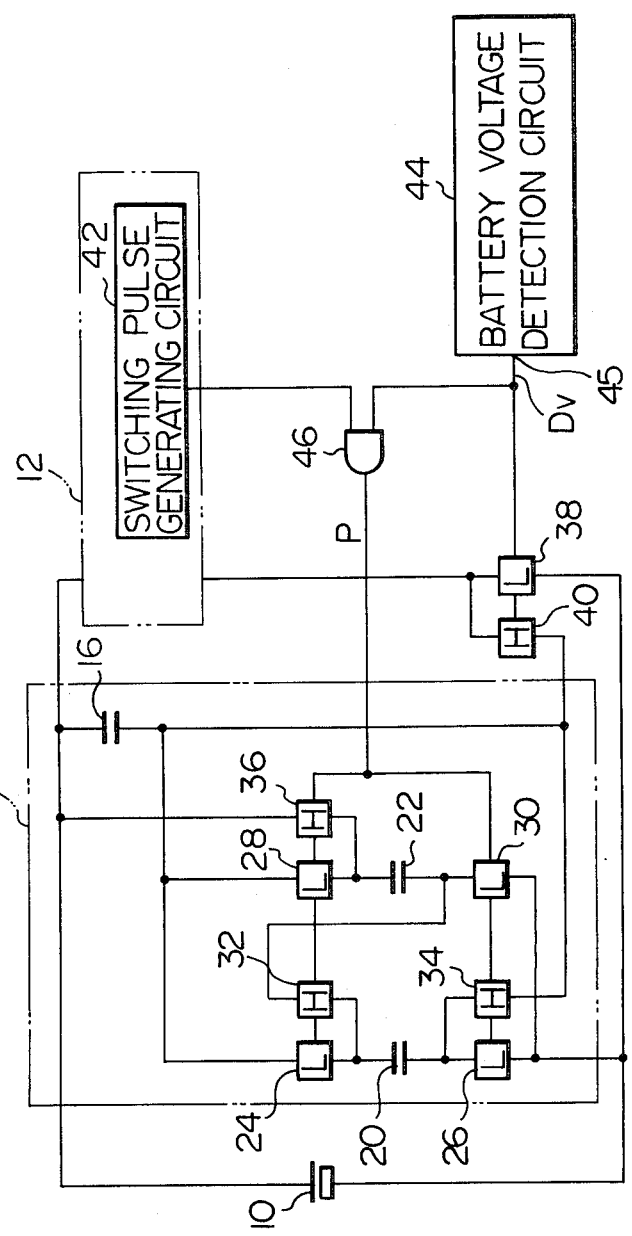
FIG. 3 is a circuit diagram of an embodiment of a voltage step-down circuit such as is described with reference to FIG. 3, and having two auxiliary capacitors.

Referring now to FIG. 3, a circuit diagram is shown of an embodiment of a voltage step-down circuit according to the present invention, which operates according to the principles described hereinabove with reference to FIG. 2. Portions of the circuit of FIG. 3 having identical functions to portions of FIGS. 2A and 2B are provided with corresponding reference numerals. In the embodiment of FIG. 3, two auxiliary capacitors 20 and 22 are utilized. A group of electronic switches 24 to 36 serve to alternately and repetitively connect capacitors 20 and 22 in parallel with one another and in series with main capacitor 16, and in series with one another and in parallel with main capacitor 16. For ease of description, the circuit network comprising auxiliary capacitors 20 and 22, main capacitor 16 and electronic switches 24 to 36 shown within a broken-line rectangle, will be referred to as voltage divider circuit 14. However it should be understood that voltage divider circuit 14 constitutes only part of the overall voltage dropping circuit, since signals must be applied to operate electronic switches 24 to 36. Such signals comprise switching pulses, designated as P, which are produced by a switching pulse generating circuit 42 contained in electronic circuit 12 and are transferred through an AND gate 46. As indicated by the letter L, electronic switches 24, 26, 28, and 30 are of a type which attain the ON (i.e. closed) state when a low logic level potential is applied to a control electrode thereof.

As indicated by the letter H, on the other hand, electronic switches 32, 34 and 36 are of a type which attain the closed state when a high logic level potential is applied to a control electrode thereof. The connections shown in FIG. 3 are intended to indicate that electronic switches 24, 26, 28 and 30 are in the closed state when signal P is at the low logic level potential, while electronic switches 32, 34 and 36 are in the OFF (i.e. open) state, and vice versa. Numeral 38 denotes an electronic switch which is controlled by an output signal Dv from a battery voltage detection circuit 44. The electronic switch 40 is also controlled by signal Dv. When the voltage of battery 10 is below a certain predetermined level, signal Dv is output by battery voltage detection circuit 44 at the low logic level potential. When the voltage of battery 10 is above this threshold level, signal Dv is output by battery voltage detection circuit 44 at the high logic level potential. To ensure satisfactory operation of the circuit, signal Dv does not go from the low to the high logic level until a predetermined time delay has elapsed. Thus, when battery 10 is first connected into the circuit of FIG. 3, electronic switch 38 will remain in the closed state for a certain time delay, so that battery 10 is connected directly across electronic circuit 12 during that time. At this time also, electronic switches 24, 26, 28 and 30 are in the closed state, so that auxiliary capacitors 20 and 22 are connected in parallel with one another and are connected in series with main capacitor 16. In this embodiment, each of main capacitor 16 and auxiliary capacitors 20 and 22 has the same value of capacitance. Thus, while signal Dv from battery voltage detection circuit 44 is at the low logic level potential, so that electronic switches 24, 26, 28 and 30 are in the closed state and auxiliary capacitors 20 and 22 are connected in parallel with one another and connected in series with main capacitor 16, the voltage developed across main capacitor 16 will be twice that developed across parallel-connected auxiliary capacitors 20 and 22, since the effective capacitance developed by the auxiliary capacitors in this case will be double that of main capacitor 16. It will be assumed that battery 10 in this embodiment is a silver cell, so that main capacitor 16 will become charged to approximately 1 V while each of auxiliary capacitors 20 and 22 will become charged to approximately 0.5 V, immediately after battery 10 is first connected into the circuit. At this time, electronic circuit 12 will start to become operative, since it becomes connected to battery 10 through switch 38. After a predetermined time delay, signal Dv from battery voltage detection circuit 44 will go to the high logic level potential, thereby enabling switching pulses P to be transferred through AND gate 46. When signal Dv goes to the high logic level also, electronic switch 38 goes to the open state, and electronic switch 40 enters the closed state, so that electronic circuit 12 is now connected across the output from voltage divider circuit 14 (i.e. across main capacitor 16) through electronic switch 40. Thereafter, the voltage dropping operation described hereinabove with reference to FIGS. 2A and 2B will begin, with electronic switches 24 to 36 operating under the control of switching pulses P to be repetitively and alternately set into the closed and open states, so that the charging and discharge states described hereinabove will be repetitively and alternately established. During the discharge state, auxiliary capacitors 20 and 22 which have been charged to 0.5 V in the charging state, will be connected in series so that a potential of 1 V is developed across them, and they are connected in parallel with main capacitor 16 across electronic circuit 12. During a subsequent time interval electronic circuit 12 is isolated from battery 10 and is supplied with power solely by discharge currents flowing from auxiliary capacitors 20 and 22 and main capacitor 16. The duration of this discharge interval is determined by the repetition frequency of switching pulses P. The level of output voltage produced by voltage divider circuit 14 and the level of a ripple component of this voltage will be determined by the repetition frequency of switching pulses P and the closed state impedances of switches 28 to 36 and 40, the values of capacitors 16, 20 and 22, the impedance of electronic circuit 12, etc.

Figure 4:
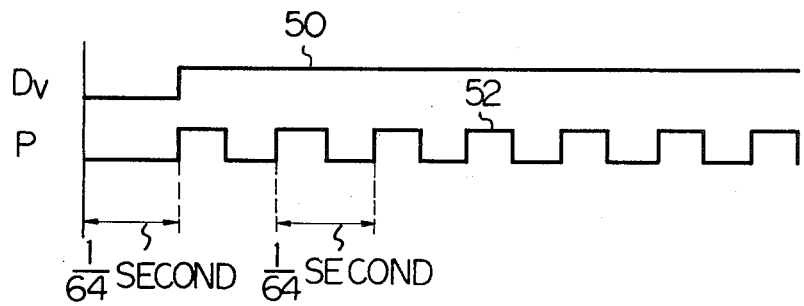
FIG. 4 is a timing diagram for illustrating the operation of the embodiment of FIG. 3.

The operation of the embodiment of FIG. 3 will now be described with reference to data obtained on the basis of computer simulation. Referring first to FIG. 4, a timing diagram is shown whose origin on the time axis corresponds to the time of connection of battery 10 to the circuit of FIG. 3. As shown, output signal Dv from battery voltage detection circuit 44 remains at the low logic level potential for a predetermined delay time, which in this case is 1/64 second, after connection of battery 10. Signal Dv then goes to the high logic level potential, as indicated by numeral 50, and thereafter switching pulses P are output through AND gate 46. In this embodiment, switching pulses P, denoted by numeral 52, are produced at a repetition rate of 64 Hz. It should be noted that subsequently, if the voltage of battery 10 should fall below the predetermined level thereof, signal Dv from battery voltage detection circuit 44 will return to the low logic level potential, so that electronic circuit 12 will become fixedly connected directly across battery 10, through electronic switch 38. However use of a voltage detection circuit is not a necessary feature of this embodiment, and a simple timer circuit can be utilized in place of battery voltage detection circuit 44 in order to provide the required control signal for AND gate 46 and electronic switches 38 and 40 immediately after a battery is connected to the circuit.

Figure 5:
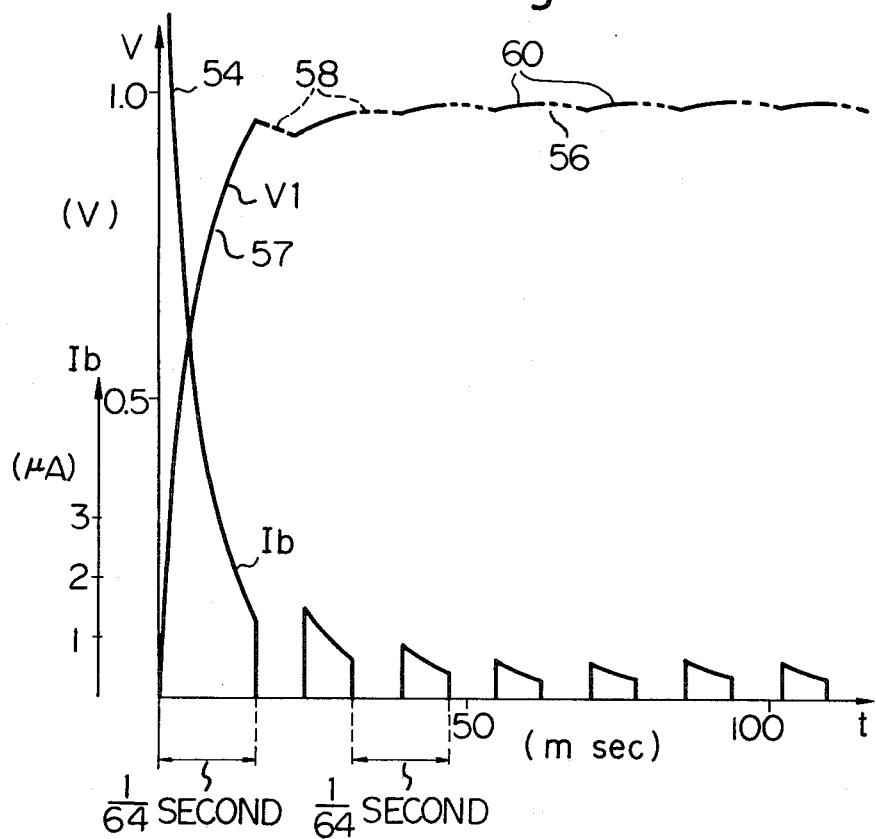
FIG. 5 is a diagram illustrating the electrical characteristics of the embodiment of FIG. 3, with respect to battery current consumption and output voltage.

FIG. 5 is a graph for illustrating the electrical characteristics of the embodiment of FIG. 3. Time is represented along the horizontal axis, and the origin of the graph corresponds to the point in time at which battery 10 is connected to the circuit of FIG. 3. Curve 56 represents the variation of the voltage appearing across the terminals of main capacitor 16, i.e. the output voltage from voltage divider circuit 14. The discontinuous set of curves 54 denote the variation of battery current Ib drawn from battery 10. As shown, when battery 10 is first connected to the circuit of FIG. 3, the voltage developed across main capacitor 14 rises rapidly, as indicated by portion 57. This represents the initial charging condition of capacitors 16, 20 and 22, and continues until both of signals Dv and P go to the high logic level potential. The voltage divider circuit 14 then enters the discharge condition, causing the output voltage therefrom to fall. The discharge condition is indicated by the broken-line portions of characteristic 56, as denoted by numeral 58. After a time interval which is determined by the repetition frequency of switching signal P (i.e. in this embodiment 1/64 second), the charging state is re-entered, causing the voltage characteristic 56 to rise. Such a charging state is denoted by the full line portions, designated by numeral 60. The slope of characteristic 57 during a charging interval is determined by the values of capacitors 20 and 22 and by the closed state impedance of electronic switches 24, 26, 28 and 30. The slope of characteristic 57 during the discharge state is determined by the impedance of electronic circuit 12 and by the closed state impedance of electronic switches 32, 34, 36 and 40. The following values were used in the computations whereby the characteristics shown in FIG. 5 were derived. A value of 0.01 μF was assumed for each of capacitors 20, 22 and 16, and a value of 100 KΩ for the closed state impedance of each of electronic switches 24 to 36, a value of 10K for the closed state impedance of each of electronic switches 38 and 40, and the impedance of electronic circuit 12 was assumed to be such that a current of 0.5 microamperes is drawn by that circuit with a supply voltage of 1.5 V, i.e. a resistance of 3 MΩ. The voltage of battery 10 was assumed to be 1.55 V, and the internal resistance of battery 10 was ignored. As can be seen from FIG. 5, the steady-state voltage which is developed across main capacitor 16, i.e. the output voltage from voltage divider circuit 14 which is applied to electronic circuit 12, is approximately 0.98 V. The current Ib which is drawn from battery 10 reaches an average steady-state value of 0.218 microamperes. The current consumed by AND gate 46 and by battery voltage detection circuit 44 has not been included in the computation of Ib. In addition, it may be necessary to use a level converter at the input terminal of AND gate 46 which is connected to switching pulse generating circuit 42. However battery voltage detection circuit 44 need only be operated intermittently, and the repetition rate of switching pulses P can be made quite low. As a result of this, the current consumed by battery voltage detection circuit 44 and by AND gate 46 will in practice be sufficiently low that it can be ignored. The output voltage of this embodiment, i.e. 0.98 V, is rather less than ⅔ of the battery voltage (1.55 V), so that the circuit does not provide an exact voltage division ratio of $n/(n+1)$ as described for the ideal case of FIGS. 2A and 2B. However, if necessary, a slightly higher value of output voltage can be obtained by altering the values of capacitors 16, 20 and 22 or by using electronic switches having lower values of closed state impedance.

Figure 6:
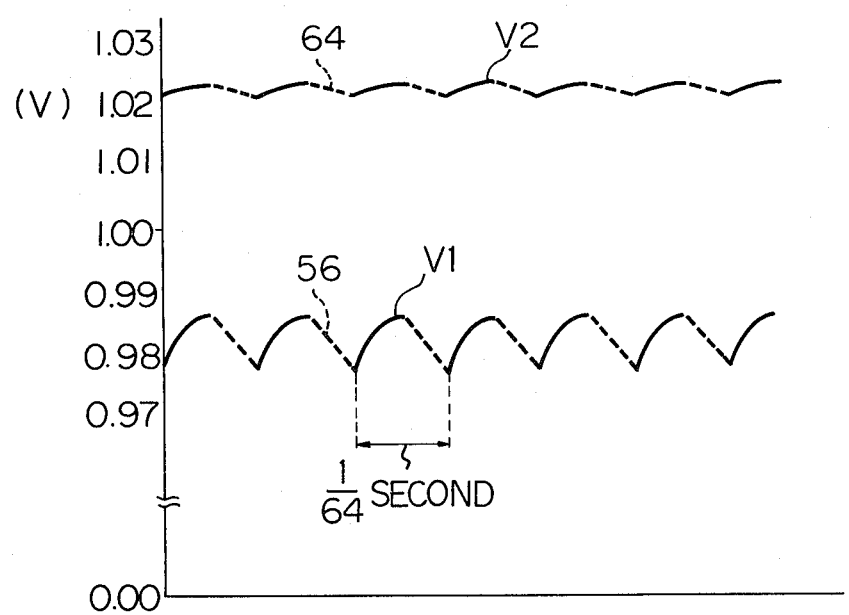
FIG. 6 is a diagram for illustrating certain of the characteristics shown in FIG. 5 in expanded form, and for illustrating the effects of changes in certain circuit constants upon these characteristics.

FIG. 6 is a diagram for illustating the steady-state output voltage characteristic of the embodiment of FIG. 3 in expanded form, and for showing the effects of a change in circuit constants. The horizontal is identical to that of FIG. 5, but begins at a point in time when the output voltage from voltage divider circuit 14 has attained a steady-state condition. The vertical axis scale has been expanded by 10 times. Curve 56 shows the steady-state output voltage characteristic of FIG. 5 in expanded form. If the values of capacitors 20, 22 and 16 of the embodiment of FIG. 3 are increased to 0.5 μF each, and the value of closed state impedance of each of electronic switches 24, 26, 38, 30, 32, 34 and 36 is reduced to 20 KΩ, with all of the other circuit constants left unaltered, then an increased level of steady-state output voltage will be obtained from voltage divider circuit 14, as is indicated by characteristic 64 in FIG. 6. This has an average value of approximately 1.022 V. With the changes in circuit constant values described above, the current which is drawn from battery 10 becomes approximately 0.227 microamperes, which is almost identical to the current consumption obtained with the original values of circuit constant. It can thus be understood that although the level of output voltage provided by a voltage dropping circuit according to the present invention can be varied to some extent by changes in circuit constants, there is very little alteration in the level of current consumption from the battery.

This property of a voltage dropping circuit according to the present invention is in contrast to the behaviour of a conventional type of voltage regulator circuit. If the output voltage from such a regulator circuit is assumed to be 1.022 V, with the battery voltage (1.55 V) and electronic circuit load impedance being identical to those of the embodiment of FIG. 3, then the current drawn from the battery would be 0.341 microamperes. With an output voltage of 0.98 V from such a voltage regulator circuit, on the other hand, the battery current consumption would be 0.327 microamperes. In either case, the battery current consumption using a prior art voltage regulator circuit to perform a voltage dropping function would be at least 1.5 times that of a voltage dropping circuit according to the present invention, i.e. a voltage dropping circuit according to the present invention will consume only ⅔ of the current drawn from the battery by a conventional voltage regulator circuit. It can thus be understood that a voltage dropping circuit according to the present invention provides a considerably higher level of conversion efficiency than can be obtained by a voltage regulator type of circuit.

Embodiments of voltage dropping circuits according to the present invention in which a plurality of groups of auxiliary capacitors are used will now be described. Referring first to FIGS. 7A and 7B, simplified circuit diagrams are shown of an embodiment for providing a voltage division ratio of $(N-2)/N$. In this embodiment, two groups of auxiliary capacitors are used, each group comprising n capacitors. In one group the capacitors are designated as 66a, 66b, ... 66n, while in the other group they are designated as 68a, 68b, ... 68n. FIG. 7A shows the charging state for this embodiment. In this state, the capacitors within each group of auxiliary capacitors are connected in parallel with one another, while each of these groups of auxiliary capacitors and main capacitor 16 are connected in series, across battery 10. As in the first embodiment, electronic circuit 12 is fixedly connected across main capacitor 16. In the discharge state, shown in FIG. 7B, the capacitors within each group of auxiliary capacitors are connected in series with one another and each group is connected in parallel with main capacitor 16 and with electronic circuit 12, while being isolated from battery 10. As in the first embodiment, electronic circuit 12 is now supplied with power by discharge currents flowing from main capacitor 16 and from groups of auxiliary capacitors 66a, 66b, ... 66n and 68a, 68b, ... 68n. It can easily be shown, by a similar method as was used to derive the voltage division ratio of the embodiment of FIGS. 2A and 2B, that repetitive alternation between the charging state of FIG. 7A and the discharge state of FIG. 7B will result in a steady-state output voltage applied to electronic circuit 12 such that the voltage division ratio is equal to $n/(n+2)$. If $(n+2)$ is designated as N, then the voltage division ratio can be written as $(N-2)/N$. It can thus be seen that this embodiment will enable voltage division ratios of ⅓, 2/4, 3/5, 4/6, and so on, to be obtained.

Another embodiment of a voltage dropping circuit according to the present invention is shown in FIG. 8. This has three groups of auxiliary capacitors each having an identical number of capacitors, i.e. n capacitors. As for the embodiment of FIGS. 7A and 7B, the capacitors within each group of auxiliary capacitors are connected in parallel with one another during the charging state, and the groups of auxiliary capacitors 70a, ... 70n, 72a, ... 72n, 74a, ... 74n are connected in series with each other and with main capacitor 16 during this charging state, as shown in FIG. 8A. During the discharge state shown in FIG. 8B, the capacitors within each group of auxiliary capacitors are connected in series with one another, and each group of auxiliary capacitors is connected in parallel with main capacitor 16 and with electronic circuit 12. It can easily be shown that in this case a voltage division ratio of $(N-3)/N$ is obtained, where $N=(n+3)$. Thus, voltage division ratios of $\frac{1}{4}$, 2/5, $\frac{3}{4}$, 4/7, ... and so on can be obtained with this embodiment.

Taking the general case of a voltage dropping circuit according to the present invention having m groups of auxiliary capacitors, each group being composed of an equal number of capacitors, i.e. n capacitors, the voltage division ratio which can be obtained is given by the expression:

$$1/\left(1 + \frac{m}{m}\right) = n/(m + n)$$

Figure 9A:
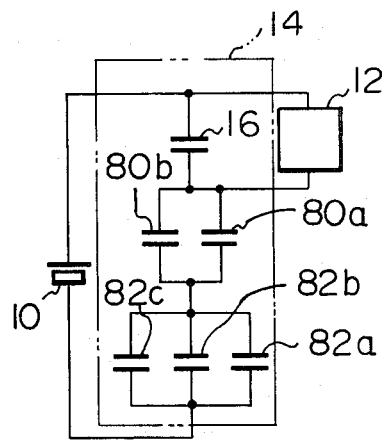
FIGS. 9A and 9B are simplified circuit diagrams for illustrating the operation of an embodiment of a voltage step-down circuit in which a plurality of groups of auxiliary capacitors with different numbers of capacitors in each group are utilized.
Figure 9B:
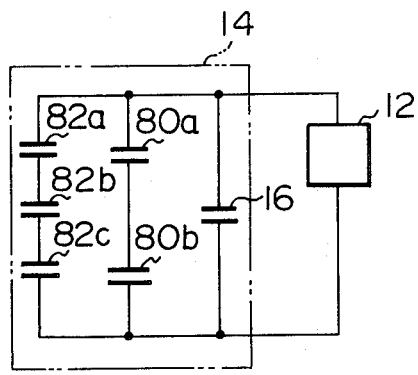

In order to provide even greater flexibility of choice of voltage division ratio with a voltage dropping circuit according to the present invention, it is possible to use a plurality of groups of auxiliary capacitors, with different numbers of capacitors being contained in each group. Such a case is shown by the embodiment illustrated by the simplified circuit diagrams of FIG. 9A and FIG. 9B. Here, a first group of auxiliary capacitors comprises two capacitors 80a and 80b, while a second group of auxiliary capacitors comprises three capacitors 82a, 82b and 82c. As for the previous embodiments, the capacitors within each group of auxiliary capacitors are connected in parallel with one another during the charging state which is shown in FIG. 9A, and the groups of auxiliary capacitors are connected in series with a main capacitor 16. In the discharbge state shown in FIG. 9B, the capacitors in each group of auxiliary capacitors are connected in series with one another, while the groups of auxiliary capacitors are connected in parallel with main capacitor 16 and with electronic circuit 12. It can easily be shown that, as a result of repetitive alternation between the charging and discharge states shown in FIGS. 9A and 9B, a voltage division ratio, i.e. the ratio between the steady-state voltage developed across main capacitor 16 and the voltage of battery 10, is given as:

$$\frac{1}{1 + \frac{1}{2} + \frac{1}{3}} = 6/11$$

Taking the general case, in which the voltage dropping circuit includes m groups of auxiliary capacitors, each group comprising respectively $n_1, n_2, \ldots n_m$ capacitors, the voltage division ratio obtained is given by the expression:

$$\frac{1}{1 + \frac{1}{n_1} + \frac{1}{n_2} + \ldots + \frac{1}{n_m}}$$

Figure 10:
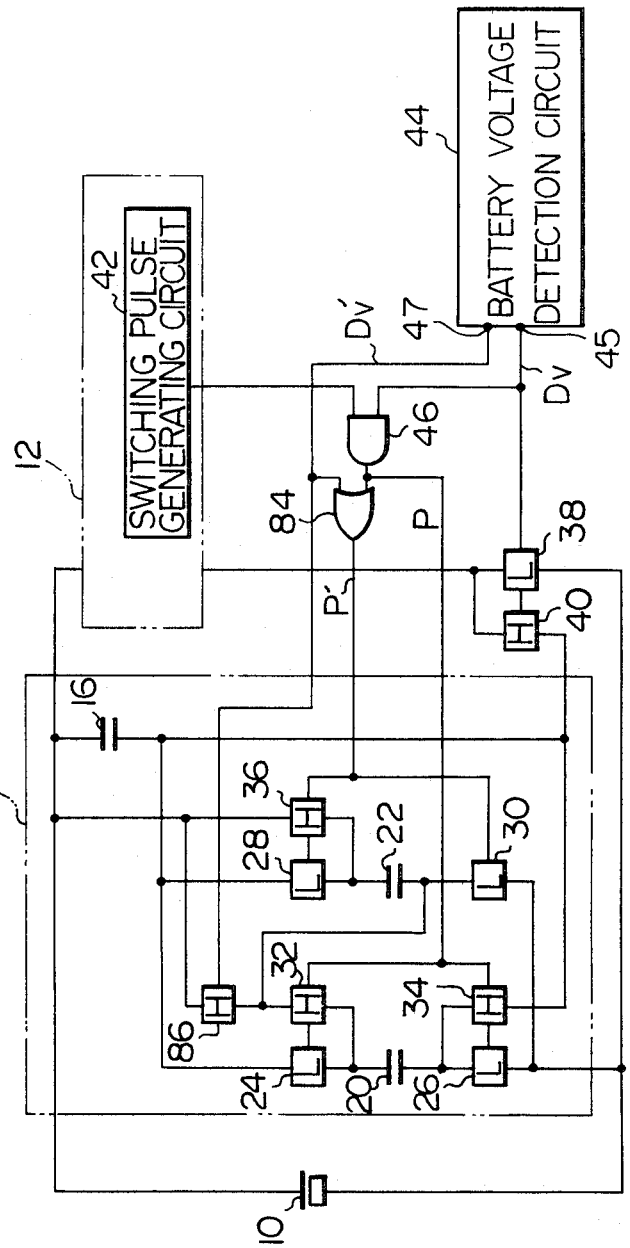
FIG. 10 is a circuit diagram of an embodiment of a voltage step-down circuit according to the present invention in which two different voltage division ratios are selectively employed in accordance with the level of battery voltage, under the control of a battery voltage detection circuit.

In the embodiments described hereinabove of voltage dropping circuits according to the present invention, a single fixed voltage division ratio is obtained in each case. However it is also possible to arrange that a plurality of possible voltage division ratios are made available within such a voltage dropping circuit, and to select suitable voltage division ratios on the basis of the level of battery voltage. In this way, an output supply voltage can be produced which varies in level by a considerably smaller amount than the battery voltage, throughout the lifetime of the battery. An embodiment of such a voltage dropping circuit will now be described with reference to FIG. 10. In FIG. 10, components having identical functions to the embodiment of FIG. 3 are identified by corresponding reference numerals. The basic difference between the embodiment of FIG. 10 and that of FIG. 3 is that a second battery voltage detection signal Dv' is produced by battery voltage detection circuit 44 in addition to detection signal Dv. As in the embodiment of FIG. 3, signal Dv goes to the high logic level so long as the voltage of battery 10 is above a first predetermined level. Subsequently, when the voltage of battery 10 falls below that predetermined level but is above a second (lower) predetermined level, detection signal Dv' also goes to the high logic level potential. Other differences between this embodiment and that of FIG. 3 lies in that an electronic switch 86 is provided, coupled across the series connection of electronic switch 36 and capacitor 22 and controlled by detection signal Dv', and an OR gate 84 is coupled to receive switching signal P from the output of AND gate 46 and also detection signal Dv'. The output signal from OR gate 84, designated as P', controls electronic switches 28, 30 and 36.

The operation of the embodiment of FIG. 10 will now be described. When battery 10 is first connected to the circuit, both of signals Dv and Dv' are initially held at the low logic level potential for a predetermined time delay, after which signal Dv goes to the high logic level, as for the embodiment of FIG. 3. In this condition, the operation of the embodiment of FIG. 10 is identical to that of FIG. 3, since electronic switch 86 is in the open state and switching pulses P are applied either directly or through OR gate 84 to each of electronic switches 24 to 36. Thus, as for the embodiment of FIG. 3, a voltage division ratio of $\frac{2}{3}$ is obtained in this condition. Subsequently when the voltage of battery 10 falls below a first predetermined level, signal Dv' goes to the high logic level potential, with signal Dv remaining at the high logic level. In this condition, electronic switch 86 is held in the closed state by signal Dv', while the output signal P' from OR gate 84 is held at the high logic level so that electronic switches 28 and 30 are held in the open state and switch 36 in the closed state. It will be apparent that auxiliary capacitor 22 is thereby effectively isolated from voltage divider circuit 14 under these conditions, so that now only auxiliary capacitor 20 is alternately and repetitively connected in parallel and in series with main capacitor 16. The voltage division ratio therefore now becomes $\frac{1}{2}$. Subsequently, when the voltage of battery 10 falls below a second predetermined level (lower than the first predetermined level), detection signal Dv goes to the low logic level potential, so that battery 10 is connected directly across electronic circuit 12 through electronic switch 38.

From the above, it can be understood that in this embodiment, electronic switches 28, 30 and 36 serve a dual function, i.e. in addition to forming part of the switch group which acts to alternately and repetitively connect auxiliary capacitors 20 and 22 in parallel with one another and in series with main capacitor 16 and vice versa, when detection signal Dv' is at the low logic level, they also serve to isolate auxiliary capacitor 22 from voltage divider circuit 14 when signal Dv' is at the high logic level.

It will be apparent that by using the basic concepts of the embodiment of FIG. 10, whereby a plurality of detection signals are output by a battery voltage detection circuit, in accordance with successive changes in the level of battery voltage, the voltage dropping ratio of a voltage dropping circuit in accordance with the present invention can be made to vary in accordance with such changes in battery voltage. In other words, the voltage division ratio can be made to vary for example successively from $\frac{1}{2}$ to $\frac{2}{3}$, $\frac{3}{4}$, and so on, as the battery voltage falls throughout the operating life of the battery. This will enable a substantially constant output supply voltage to be produced by such a voltage dropping circuit over a much longer period of time than has hitherto been possible, due to the very low current consumption which can be attained by such a voltage dropping circuit. In other words, the initial voltage division ratio can be arranged such that the supply voltage produced by voltage divider circuit 14 is close to the output voltage that will be provided by battery 10 towards the end of the battery lifetime. Successive changes in the voltage division ratio will result in the output supply voltage being held substantially close to that value, throughout the life of the battery. In this way, much of the advantages of a regulated power supply can be obtained, but with a considerably lower level of power being dissipated by the power supply circuit.

All of the embodiments of DC-to-DC converters described above have been in the form of voltage dropping circuits. However, a DC-to-DC converter circuit according to the present invention can also be arranged to provide a voltage step-up function, and some embodiments of such voltage step-up circuits will be described in the following.

Before doing so, a prior art type of voltage multiplier circuit utilizing capacitors will first be described, with reference to the simplified circuit diagrams of FIGS. 11A and 11B. FIG. 11A shows the charging state, and FIG. 11B the discharge state. Numeral 10 denotes a battery, numeral 12 an electronic circuit and numeral 88 which steps up the voltage of battery 10 to provide a supply voltage to power electronic circuit 12. The voltage multiplier circuit 88 comprises a power supply capacitor 90, and voltage step-up capacitors 92a, 92b, ... 92n. For the charging state of FIG. 11A, capacitors 92a to 92n are connected in parallel and are charged from battery 10. In the discharge condition of FIG. 11B, capacitors 92a to 92n are connected in series across power supply capacitor 90, and in this condition power supply capacitor 90 is charged from capacitors 92a to 92n.

It will be apparent that the voltage multiplication ratio provided by such a circuit will be equal to the number n of voltage step-up capacitors. However, only integral multiples of the battery voltage can be provided by such a circuit. This is disadvantageous for certain applications. For example, if a silver cell having a voltage of 1.5 V is used as the power source for a liquid crystal display cell matrix drive circuit, then a prior art voltage multiplier circuit such as that of FIGS. 11A and 11B can be used to provide a voltage multiplication ratios of 2:1 and 3:1. In this way, the three potential levels 1.5 V, 3 V and 4.5 V can be obtained to supply the matrix drive circuit. However if a lithium battery is used as the power source for such a liquid crystal cell matrix drive circuit, with a voltage of 3 V, then although it is simple to provide a 1.5 V potential by voltage division of the battery voltage by conventional divider circuits, it has not been possible hitherto to provide an efficient voltage mulitplier circuit to provide a potential of 4.5 V in such a case. For this reason, it has been customary to use the potential levels of 1 V, 2 V and 3 V, when a lithium battery is used to power a liquid crystal cell matrix drive circuit, since these potentials can be easily provided by voltage division of the battery voltage. However it is highly desirable to be able to use a common type of liquid crystal display cell and matrix drive circuit, irrespective of whether a silver battery or lithium battery is used as the power source, and this has not been possible on a practical basis due to the limitations of prior art types of voltage multiplier circuits. However, with a voltage step-up circuit according to the present invention, a voltage multiplication ratio of 1.5 times can be easily achieved.

An embodiment of a voltage step-up circuit according to the present invention will now be described with reference to the simplified circuit diagrams of FIGS. 12A and 12B. The circuit is based on a voltage multiplier circuit 93, comprising a power supply capacitor 90, a main capacitor 94, and a group of n auxiliary capacitors 96a, 96b, ... 96n. The circuit is powered by a battery 10, and supplies an output voltage to an electronic circuit 12. For the charging condition, shown in FIG. 12A, auxiliary capacitors 96a to 96n are connected in series with one another and connected in parallel with main capacitor 94. In this condition, main capacitor 94 and auxiliary capacitors 96a to 96n are charged from battery 10 and isolated from electronic circuit 12. In the discharge condition, shown in FIG. 12B, auxiliary capacitors 96a to 96n are connected in parallel with one another and are connected in series with main capacitor 94. In this condition, the main and auxiliary capacitors are isolated from battery 10, and discharge into power supply capacitor 90.

Figure 12A:
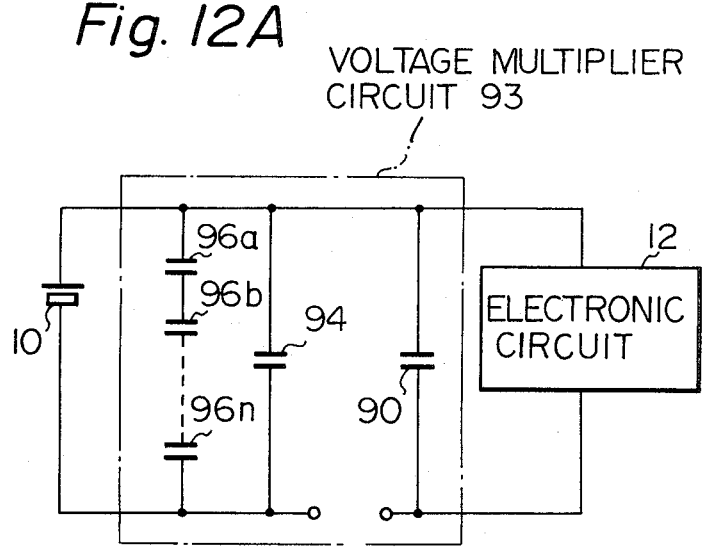
FIGS. 12A and 12B are simplified circuit diagrams for illustrating the principles of operation of a DC-to-DC converter circuit according to the present invention, comprising a voltage step-up circuit.

If the voltage of battery 10 is designated as Vbt, then for the charging condition shown in FIG. 12A each of the n auxiliary capacitors 96a to 96n will become charged to a potential Vbt/n, while main capacitor 94 will become charged to a potential Vbt. In the discharge condition shown in FIG. 12B, since main capacitor 94 is connected in series with the group of auxiliary capacitors 96a to 96n, which are connected in parallel with one another, the potential applied to power supply capacitor 90 will be equal to the sum of the voltage across main capacitor 94 and that across each of auxiliary capacitors 96a to 96n, i.e. will be equal to Vbt+Vbt/n. Thus, the voltage multiplication ratio of this embodiment is $(1+1/n):1$.

As in the case of the voltage step-down embodiments described hereinabove, the actual voltage conversion ratio may be somewhat lower than that given by the above relationship, due to the effects of switch impedances, the impedance of electronic circuit 12, etc. However this is also true of a conventional voltage multiplier circuit which employs capacitor charge switching.

Figure 12B:
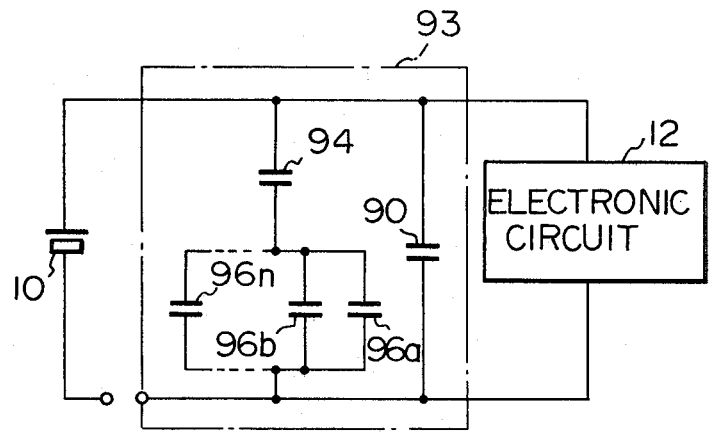

All of the capacitors in the circuit of FIGS. 12A and 12B can be of identical value, other than the power supply capacitor 90.

Figure 13A:
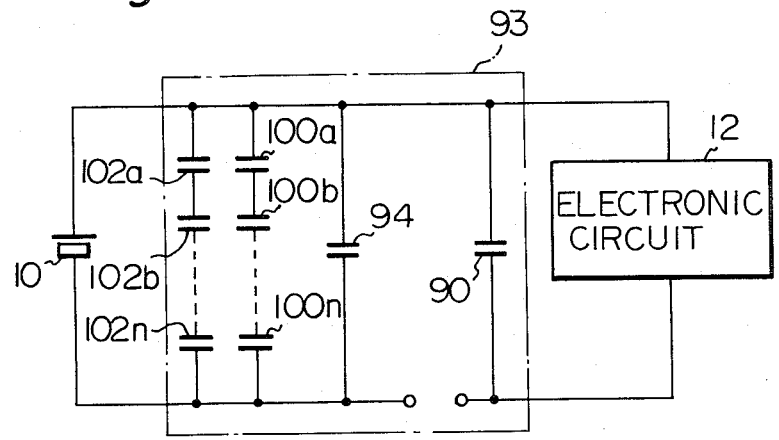
FIGS. 13A and 13B are simplified circuit diagrams for illustrating the operation of an embodiment of a voltage step-up circuit according to the present invention, having two groups of auxiliary capacitors.
Figure 13B:
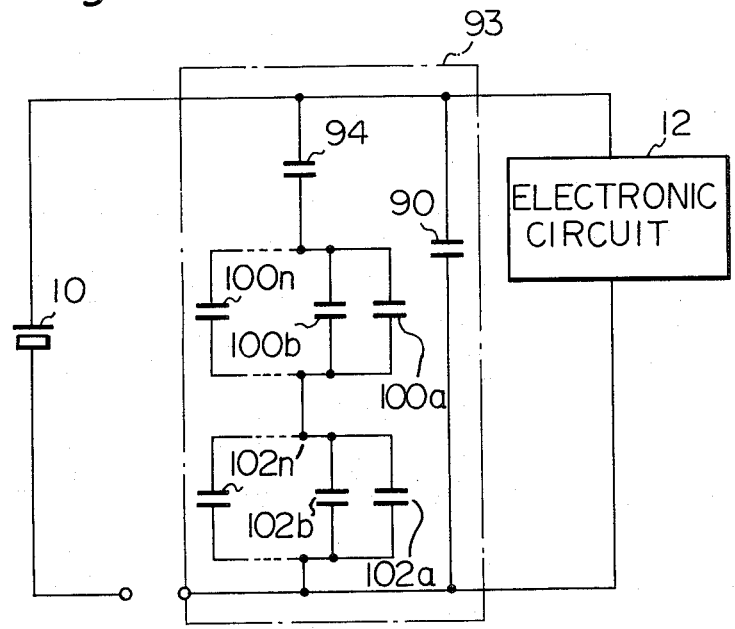

FIGS. 13A and 13B are simplified circuit diagrams of another embodiment of the present invention. Here, voltage multiplier circuit 93 comprises a power supply capacitor 90, main capacitor 94, a first group of n auxiliary capacitors 100a, 100b, ... 100n, and a second group of n' auxiliary capacitors 102a, 102b, ... 102n', where n and n' may be different. As in the embodiment of FIGS. 12A and 12B, voltage multiplication is performed by repetitive alternation between the charging condition shown in FIG. 13A and the discharge condition shown in FIG. 13B. Designating the value of voltage from battery 10 as Vbt, the supply voltage produced by voltage multiplier circuit is given as:

$$Vbt + Vbt/n + Vbt/n'$$

Thus, the voltage multiplication ratio is given as:

$$(1 + 1/n + 1/n'):1$$

If n=n', then the voltage multiplication ratio is equal to (1+2/n):1

In general, if n groups of auxiliary capacitors are utilized, with each group comprising n capacitors, a voltage multiplication ratio of (1+n/m):1 is obtained.

It will be apparent that in fact any desired value of voltage multiplication ratio can be obtained by such a circuit, through the use of a plurality of groups of auxiliary capacitors containing different numbers of capacitors, or containing capacitors of differing values.

Figure 14A:
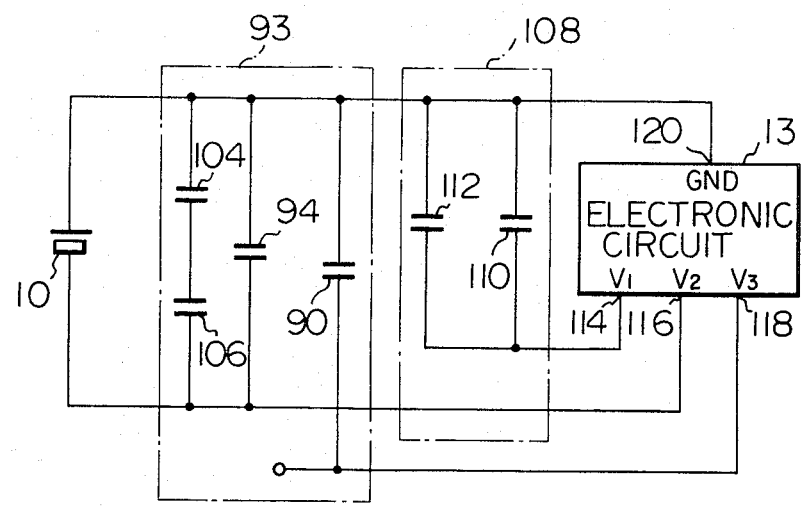
FIGS. 14A and 14B are simplified circuit diagrams for illustrating the operation of a combination of a capacitor voltage divider type of voltage step-down circuit with a voltage step-up circuit according to the present invention, for thereby providing three different supply voltage levels by conversion of a battery voltage.
Figure 14B:
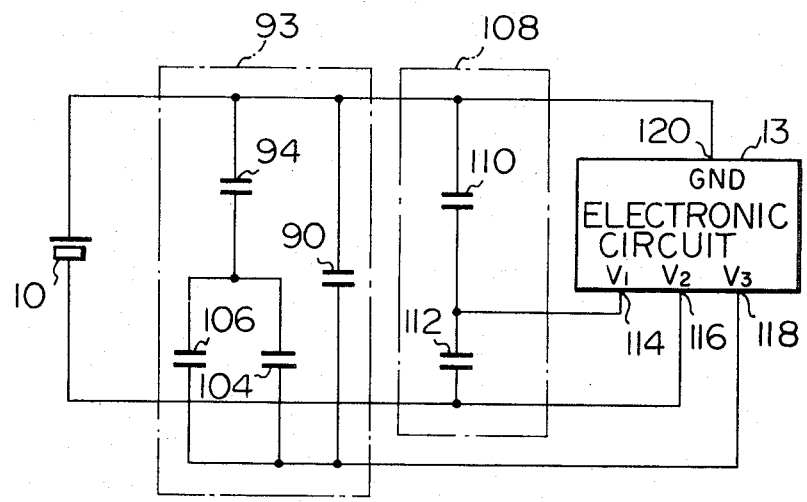

Referring now to FIGS. 14A and 14B, an embodiment of the present invention is shown, whereby the three potential levels 1.5 V, 3 V and 4.5 V can be obtained from a 3 V lithium battery, for supplying power to the matrix drive circuit of a liquid crystal display cell. This embodiment includes a voltage step-up circuit according to the present invention in conjunction with a capacitor type voltage divider circuit known in the prior art and described hereinabove. Numeral 10 denotes a 3 V lithium battery, and numeral 13 an electronic circuit which includes a liquid crystal display cell matrix drive circuit operating from the three potential levels $V_1$, $V_2$ and $V_3$, i.e. 1.5 V, 3 V and 4.5 V respectively. Numeral 93 denotes a voltage multiplier circuit according to the present invention for generating potential $V_3$, comprising a power supply capacitor 90, auxiliary capacitors 104 and 106, and a main capacitor 94. Numeral 108 denotes a voltage divider circuit for providing potential $V_1$, comprising voltage dropping capacitors 110 and 112.

FIG. 14A shows a condition of this circuit in which charging of voltage multiplier circuit 93 from battery 10 takes place, and discharge from voltage divider circuit 108 takes place with both of capacitors 110 and 112 being connected to terminal 114 of electronic circuit 13. In the condition shown in FIG. 14B, voltage multiplier circuit 93 is in the discharge state, and is connected to terminal 118 of electronic circuit 13, while capacitors 110 and 112 are connected in series across battery 10 to be charged therefrom. As a result of repetitive alternation between the conditions shown in FIGS. 14A and 14B, a steady-state potential equal to 1.5 times the voltage $V_2$ of battery 10 is developed across power supply capacitor 90 of voltage multiplier circuit 93 and is applied to terminal 118 of electronic circuit 13. The output of voltage divider circuit 118, applied to terminal 114 of electronic circuit 13, is 0.5 times the voltage of battery 10, i.e. $V_2$.

In the embodiments of FIGS. 14A and 14B, the potentials $V_1$, $V_2$ and $V_3$ are −1.5 V, −3 V and −4.5 V respectively. This is for the case of battery 10 being a lithium battery. If a silver battery, having a voltage of 1.5 V is used instead of a lithium battery, it is still possible to produce the above three potential levels −1.5 V, −3 V and −4.5 V, if the circuit of FIGS. 14A and 14B is modified to replace voltage divider circuit 108 by a voltage step-up circuit according to the present invention which will provide a 3:1 voltage multiplication ratio. It can thus be understood that use of voltage multiplier circuits according to the present invention will enable a common type of liquid crystal display cell and matrix drive circuit to be used in battery-powered electronic devices, irrespective of the type of battery which is employed.

Figure 15:
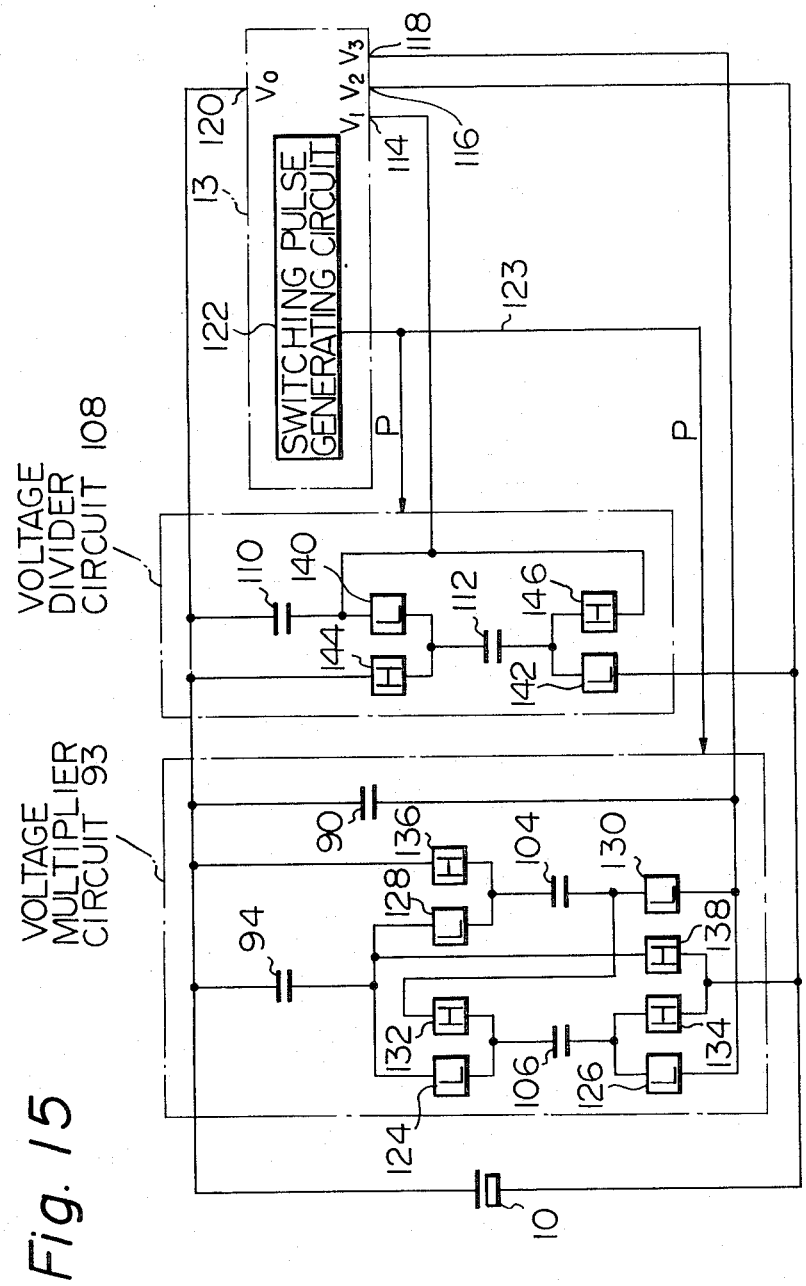
FIG. 15 is a circuit diagram of an embodiment of a DC-to-DC voltage conversion circuit operating according to the principles shown in FIGS. 14A and 14B.

A more detailed circuit diagram of the embodiment of FIGS. 14A and 14B is shown in FIG. 15. As shown, electronic circuit 13 includes a switching pulse generating-circuit 122 which produces switching pulses P for controlling electronic switches provided in voltage multiplier circuit 93 and in voltage divider circuit 108. Voltage multiplier circuit 93 includes, in addition to capacitors 90, 94, 104 and 106, a group of electronic switches 124 to 138. These are responsive to switching pulses P for repetitively and alternately setting auxiliary capacitors 104 and 106 in parallel with one another and in series with main capacitor 94, and in series with one another and in parallel with main capacitor 94. Thus, as described hereinabove, a voltage multiplication ratio of 3/2 is obtained, so that a potential of 4.5 V is applied to terminal 118 of electronic circuit 12. The ratio of 3/2 is obtained since in this case n=2.

Electronic switches 140 to 146 in voltage divider circuit 108 are responsive to switching signal P for alternately and repetitively setting capacitors 110 and 112 in parallel and in series with one another, to be charged from battery 10 and to discharge into electronic circuit 13, whereby a potential of 1.5 V is applied to terminal 114 of electronic circuit 13.

From the above description of the preferred embodiments, it can be understood that a DC-to-DC converter circuit according to the present invention can be coupled to a battery for providing a supply voltage whose value is equal to the voltage of the battery multiplied or divided by a factor which can be an integer or non-integer and which can be freely determined by appropriate selection of a plurality of auxiliary capacitors within the DC-to-DC converter circuit. Such a DC-to-DC converter circuit can therefore greatly extend the range of application of electronic devices which can be battery-powered but for which a very low level of power consumption is essential, and can enable identical models of such electronic devices to be powered by different types of batteries, e.g. silver batteries and lithium batteries, without modification to the circuitry thereof.

From the preceding description, it will be apparent that the objectives set forth for the present invention are effectively attained. Since various changes and modifications to the above construction may be made without departing from the spirit and scope of the present invention, it is intended that all matter contained in the above description or shown in the accompanying drawings shall be interpreted as illustrative and not in a limiting sense. The appended claims are intended to cover all of the generic and specific features of the invention described herein.

What is claimed is:

1. The combination of a battery voltage detection circuit and a DC-to-DC converter circuit for converting the voltage of a battery for thereby producing a power supply voltage to be applied to a load, said battery voltage detection circuit being operable for producing detection signals in accordance with the value of said battery voltage, said DC-to-DC converter circuit comprising:

a main capacitor;
a plurality of auxiliary capacitors;
a source of switching signals provided by said load; and
switch means responsive to said switching signals for controlling the interconnection conditions between said main capacitor, said auxiliary capacitors, said load and said battery such as to repetitively and alternately establish a first operating condition in which said auxiliary capacitors are connected in parallel with one another and are connected in series with said main capacitor and a second operating condition in which said auxiliary capacitors are connected in series with one another and are collectively connected in parallel with said main capacitor, said switch means being coupled to said auxiliary capacitors and responsive to said detection signals for selectively varying the number of said auxiliary capacitors effectively functioning in said DC-to-DC converter circuit, for thereby varying the value of the ratio between said supply voltage and said battery voltage in a manner to compensate for changes in said battery voltage.

2. A DC-to-DC converter circuit for converting the voltage of a battery for thereby providing a first and a second power supply voltage to be applied to first and second input terminals of a load respectively, the value of said first power supply voltage being equal to said battery voltage multiplied by a factor of 3/2 the value of said second power supply voltage being equal to one half of said battery voltage, comprising:

a source of switching signals provided by said load;
a power supply capacitor fixedly connected across said first input terminals of said load;
a main capacitor;
a pair of auxiliary capacitors;
a first group of electronic switches coupled to control the interconnection conditions between said main capacitor, said auxiliary capacitors, said battery and said first input terminals of said load, and responsive to said switching signals for establishing a first operating condition in which said auxiliary capacitors are connected in parallel with one another and are collectively connected in series with said main capacitor across said first input terminals of said load while being disconnected from said battery, and a second operating condition in which said auxiliary capacitors are connected in series with one another and are collectively connected in parallel with said main capacitor across said battery while being disconnected from said first input terminals of said load, said first group of electronic switches acting to repetitively and alternately establish said first and second operating states for thereby developing said first power supply voltage across said first input terminals of said load;
first and second voltage dropping capacitors, said first voltage dropping capacitor being fixedly connected across said second input terminals of said load; and a second group of electronic switches coupled to control the interconnection conditions between said first and second voltage dropping capacitors, said battery and said second input terminals of said load in response to said switching signals for thereby repetitively and alternately establishing a first operating condition in which said first and second voltage dropping capacitors are connected in series across said battery and a second operating condition in which said first and second voltage dropping capacitors are connected in parallel across said second input terminals of said load, whereby said second power supply voltage is developed across said second input terminals of said load.

3. A DC-to-DC converter circuit according to claim 2, in which said load comprises an electronic circuit and in which said source of switching signals comprises a switching signal generating circuit forming a part of said electronic circuit.

4. A DC-to-DC converter circuit according to claim 3, in which said battery is a lithium battery.

5. A DC-to-DC converter circuit according to claim 4, in which said electronic circuit comprises a matrix drive circuit for a liquid crystal display device.

6. A DC-to-DC converter circuit for converting the voltage of a battery for thereby producing a power supply voltage to be applied to a load, comprising:

a main capacitor, said main capacitor being fixedly connected in parallel with said load;
a set of n auxiliary capacitors each having a value of capacitance equal to that of said main capacitor wherein "n" is an integer;
a source of switching signals provided by said load; and a plurality of electronic switch means responsive to said switching signals for controlling the interconnection conditions between said main capacitor, said auxiliary capacitors, said load and said battery such as to repetitively and alternately establish a first operating condition in which said n auxiliary capacitors are connected in parallel with one another and are connected in series with said main capacitor and a second operating condition in which said n auxiliary capacitors are connected in series with one another and are collectively connected in parallel with said main capacitor, to thereby establish a value of said power supply voltage which is substantially equal to said battery voltage multiplied by a factor which is a function of n, during said first operating condition said auxiliary capacitors being connected in parallel with one another and being connected as a group in series with said main capacitor across said battery to be charged therefrom, and during said second operating condition, said auxiliary capacitors being disconnected from said battery and being connected in series with one another and connected as a series-connected group in parallel with said main capacitor, to thereby establish a value of said supply voltage which is substantially equal to said battery voltage multiplied by a factor $n/(n-1)$.

7. A DC-to-DC converter circuit according to claim 6, and further comprising a power supply capacitor fixedly connected across said load, and in which said auxiliary capacitors are arranged as a set of m groups, and in which during said first operating condition the auxiliary capacitors of the respective groups are connected in series with one another and said m groups are disconnected from said load and connected in parallel with one another and with said main capacitor across said battery to be charged thereby, and in which during said second operating condition the capacitors of each of said groups of auxiliary capacitors are respectively connected in parallel with one another and said groups of auxiliary capacitors connected in series with one another and said main capacitor across said load, with said main capacitor and auxiliary capacitors being disconnected from said battery.

8. A DC-to-DC converter circuit according to claim 6, and further comprising electronic switch means coupled to said auxiliary capacitors for selectively varying the number of auxiliary capacitors effectively functioning in said DC-to-DC converter circuit, for thereby varying the value of said supply voltage.

9. A DC-to-DC converter circuit for converting the voltage of a battery for thereby producing a power supply voltage to be applied to a load, comprising:
- a power supply capacitor fixedly connected in parallel with said load;
- a main capacitor;
- a set of n auxiliary capacitors each having a value of capacitance equal to that of said main capacitor wherein "n" is an integer;
- a source of switching signals provide by said load; and
- a plurality of electronic switch means responsive to said switching signals for controlling the interconnection conditions between said main capacitor, said auxiliary capacitor, said load and said battery such as to repetitively and alternately establish a first operating condition in which said n auxiliary capacitors are connected in parallel with one another and are connected in series with said main capacitor and a second operating condition in which said n auxiliary capacitors are connected in series with one another and are collectively connected in parallel with said main capacitor, to thereby establish a value of said power supply voltage which is substantially equal to said battery voltage multiplied by a factor which is a function of n, during said first operating condition said auxiliary capacitors being connected in parallel with one another and being connected as a group in series with said main capacitor, with said main capacitor and auxiliary capacitors being disconnected from said battery; and further during said second operating condition said auxiliary capacitors being connected in series with one another and being connected as a group in parallel with said main capacitor and in parallel with said battery to be charged therefrom, with said main capacitor and auxiliary capacitors being disconnected from said load to thereby establish a value of said supply voltage which is substantially equal to said battery voltage multiplied by a factor of $(1+1/n)$.

10. A DC-to-DC converter circuit for converting the voltage of a battery for thereby producing a power supply voltage to be applied to a load, comprising:
- a power supply capacitor fixedly connected across said load;
- a main capacitor;
- a set of n auxiliary capacitors each having a value of capacitance equal to that of said main capacitor and in which said auxiliary capacitors are arranged as a set of m groups wherein "n" and "m" are integers;
- a source of switching signals provided by said load; and
- a plurality of electronic switch means responsive to said switching signals for controlling the interconnection conditions between said main capacitor, said auxiliary capacitors, said load and said battery such as to repetitively and alternately establish a first operating condition in which said n auxiliary capacitors are connected in parallel with one another and are connected in series with said main capacitor and a second operating condition in which said n auxiliary capacitors are connected in series with one another and are collectively connected in parallel with said main capacitor, to thereby establish a value of said power supply voltage which is substantially equal to said battery voltage multiplied by a factor which is a function of n, during said first operating condition the auxiliary capacitors of the respective groups being connected in series with one another and said m groups being disconnected from said load and connected in parallel with one another and with said main capacitor across said battery to be charged thereby, and during said second operating condition the capacitors of each of said groups of auxiliary capacitors being respectively connected in parallel with one another and said groups of auxiliary capacitors being connected in series with one another and said main capacitor across said load, with said main capacitor and auxiliary capacitors being disconnected from said battery, each of said groups of auxiliary capacitors containing an indentical number s of capacitors wherein "S" is an integer, whereby the value of said supply voltage is established which is substantially equal to said battery voltage multiplied by a factor $(1+s/m)$.

* * * * *